(12) United States Patent
Sie et al.

(10) Patent No.: US 7,635,827 B2
(45) Date of Patent: Dec. 22, 2009

(54) COOKING APPARATUS WITH SAFETY DEVICE

(75) Inventors: Bradley Dean Sie, Mondovi, WI (US); Chevis Watkinson, Brookfield, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 630 days.

(21) Appl. No.: 11/365,965

(22) Filed: Mar. 1, 2006

(65) Prior Publication Data

US 2007/0204863 A1 Sep. 6, 2007

(51) Int. Cl.
*H05B 1/02* (2006.01)

(52) U.S. Cl. ............... 219/482; 219/450.1; 219/525; 219/541; 99/378; 439/138

(58) Field of Classification Search ........ 219/494, 219/450.1, 459.1, 535, 541, 481, 482; 99/378; 439/135–138
See application file for complete search history.

(56) References Cited

U.S. PATENT DOCUMENTS

| | | |
|---|---|---|
| 3,068,442 A | 12/1962 | Kubik et al. |
| 3,218,434 A | 11/1965 | Lee et al. |
| 3,635,432 A | 1/1972 | Hollander |
| 5,495,845 A | 3/1996 | Hait |
| 5,504,295 A | 4/1996 | Collas et al. |
| 6,252,204 B1 * | 6/2001 | Po-Hei ............ 219/450.1 |
| 6,262,399 B1 | 7/2001 | Lau et al. |
| 6,472,644 B1 * | 10/2002 | Wu ............... 219/450.1 |
| 6,776,085 B1 * | 8/2004 | Tang .................. 99/375 |
| 6,935,874 B1 * | 8/2005 | Fang et al. ........... 439/137 |
| 2008/0142503 A1 * | 6/2008 | Li et al. ............. 219/450.1 |

* cited by examiner

*Primary Examiner*—Mark H Paschall
(74) *Attorney, Agent, or Firm*—Patterson, Thuente, Skaar & Christensen, P.A.

(57) ABSTRACT

A cooking apparatus powered by a detachable electrical control, the apparatus having a cooking surface and a support member hingedly attached to the cooking surface. The support member has a folded position generally parallel to the cooking surface and an extended position generally perpendicular to the cooking surface. A barrier element extends generally perpendicularly from the support member. An inlet port is disposed on the cooking surface, defining an opening, and having a connector sized to fit the detachable electrical control. The inlet port is electrically connected to the heating element and disposed on the cooking surface proximate the barrier element such that the barrier element obstructs the inlet port's connector when the support member is folded under the cooking surface and the barrier element does not obstruct the inlet port's connector when the support member is unfolded and generally perpendicular to the cooking surface.

16 Claims, 11 Drawing Sheets

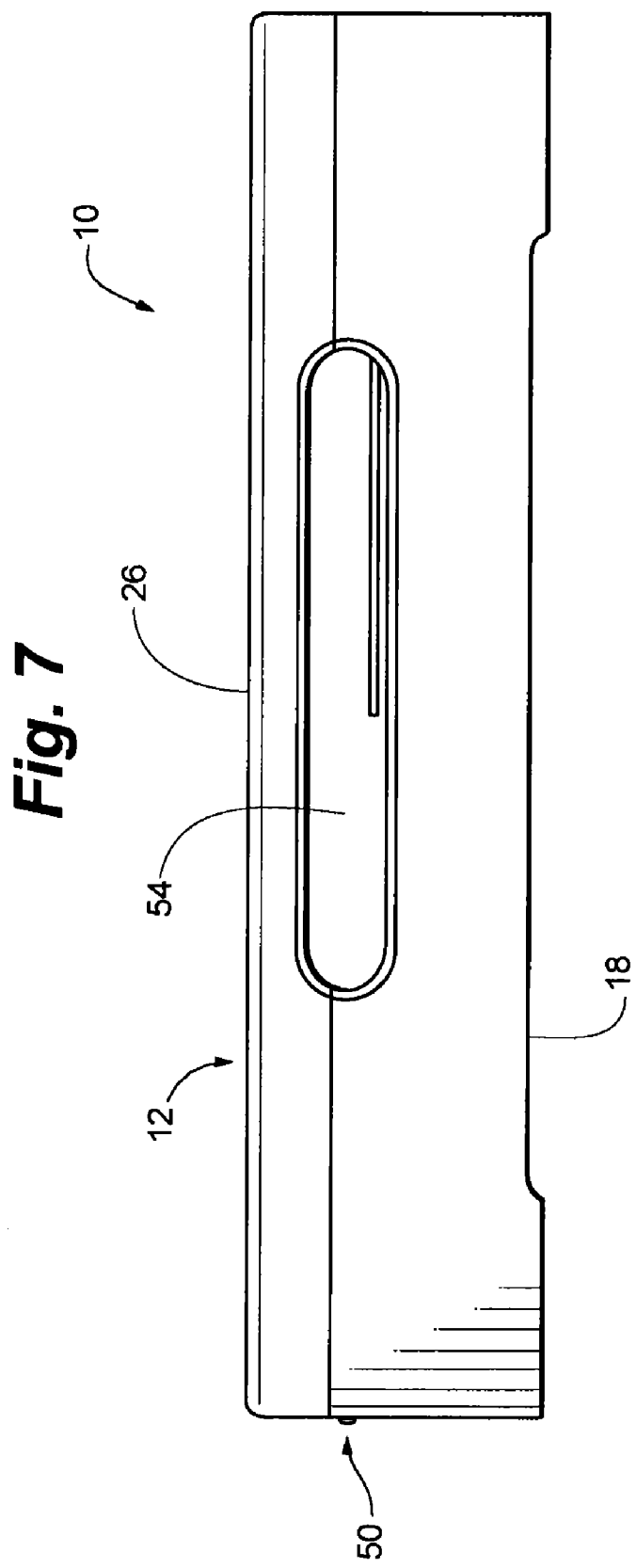

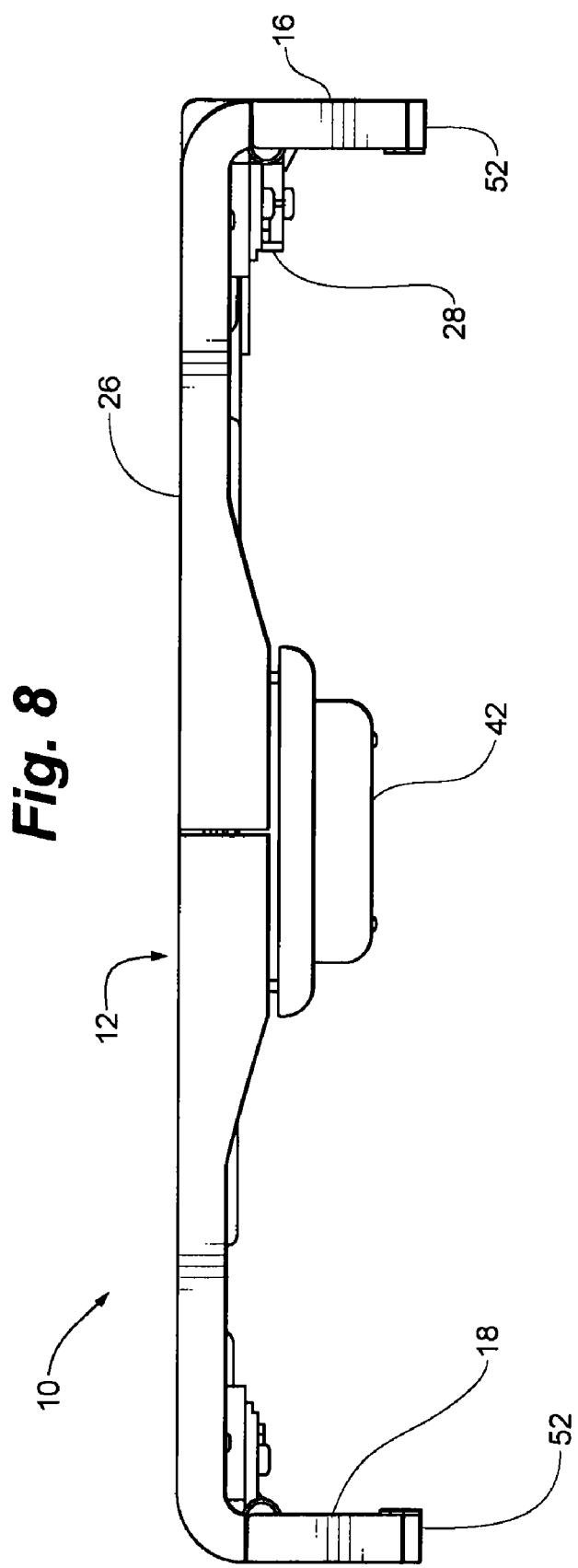

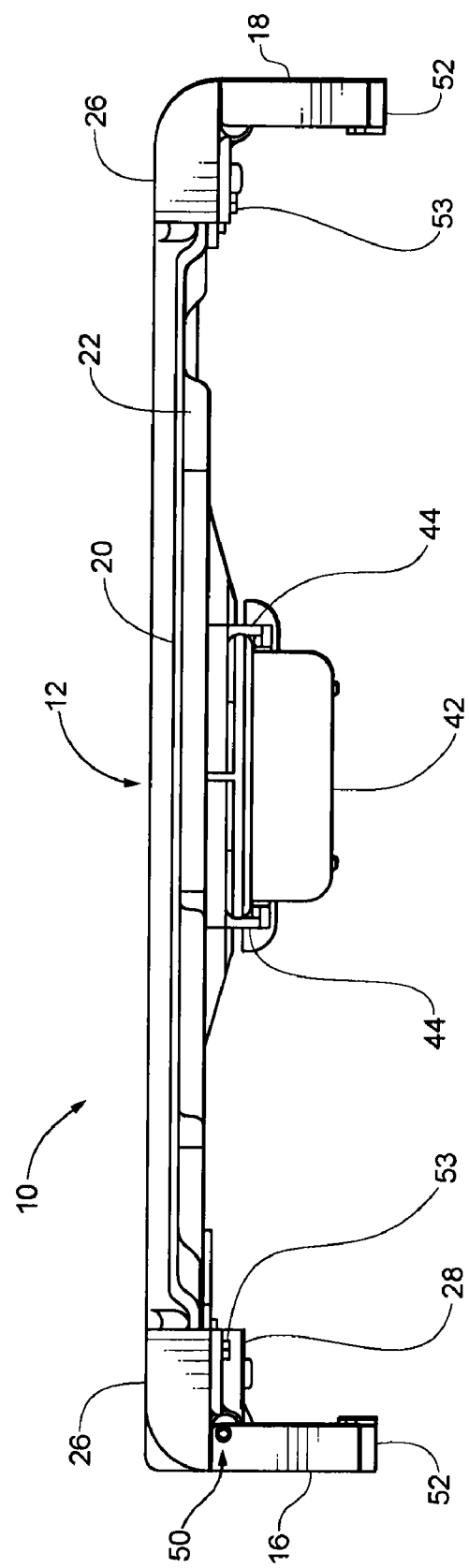

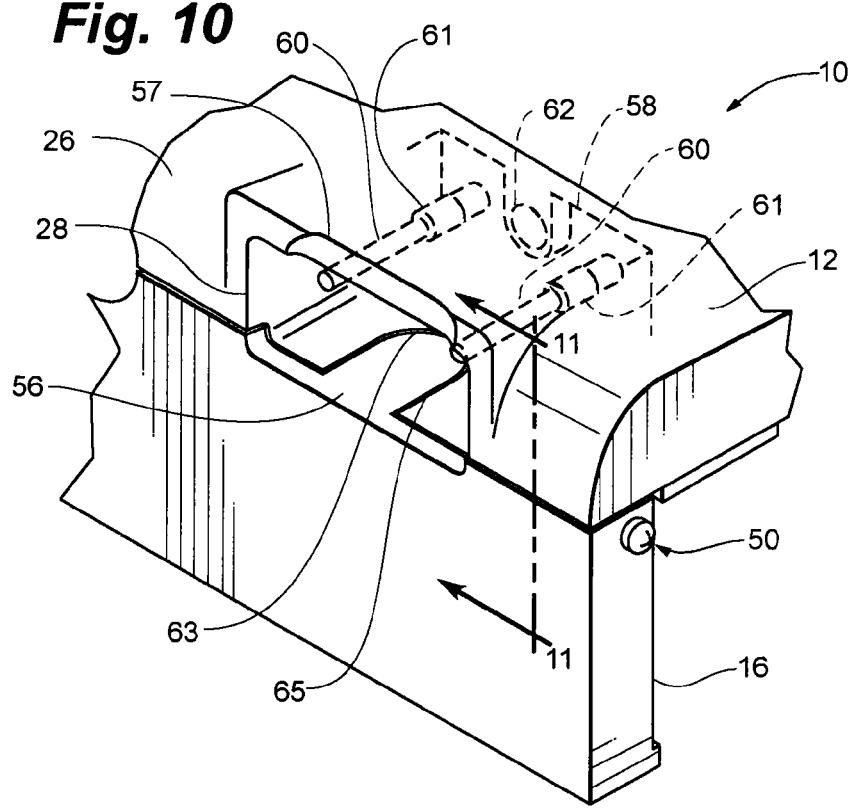
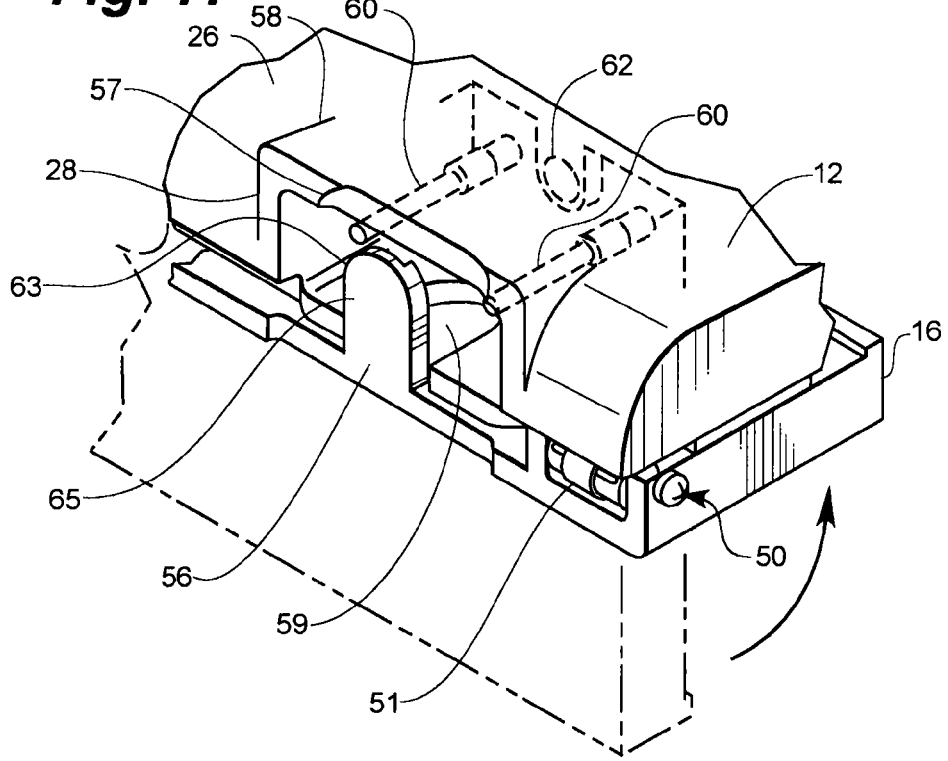

COOKING APPARATUS WITH SAFETY DEVICE

FIELD OF THE INVENTION

The present invention relates to cooking apparatuses and particularly to a cooking apparatus with folding supports that include an integral barrier to prevent unsafe interactions with the external power source.

BACKGROUND OF THE INVENTION

There is a need for a portable cooking apparatus for locations where permanent structures are unavailable or when specific needs arise. An example of such a device is an electric grill or griddle. The device is heated when the user connects an onboard electric heating element to an external power source via a port on the griddle and thereby initiates a flow of current to the heating element.

For a variety of reasons, it is useful to elevate the cooking surface of such devices from the surface on which the device rests. One reason to elevate the device is to avoid transfer of heat from the cooking surface to the support surface. Another reason would be to make room for additional components underneath the cooking surface, such as the addition of a drip pan under a grill or griddle. Supports such as legs are thus used to elevate cooking appliances. Retractable or folding legs offer the advantage of easier storage and improved portability, but also present the risk that the cooking surface will be heated when the legs are still folded and the cooking surface is too close to the support surface, making the operation of the device unsafe.

The risk of collapse is also a concern when folding legs are used with cooking surfaces. The use of external power typically requires a cord and possibly also a temperature-control device to be connected to the cooking appliance. Such temperature-control devices, as disclosed in U.S. Pat. No. 3,218,434, extend from the cooking apparatus and may be easily pulled or bumped during use. When this happens to a cooking apparatus having folding legs, it can cause the cooking appliance to fall or become unbalanced. Any collapse or imbalance in the cooking device when connected to a power source is undesirable because of the high temperatures usually involved in cooking and the likelihood that hot food, oil, or fat in the cooking appliance will be spilled.

Safety mechanisms have been devised that regulate the use of a temperature-control device in connection with a cooking apparatus. For example, mechanisms such as those disclosed in U.S. Pat. No. 6,935,874, U.S. Pat. No. 6,472,644 and U.S. Pat. No. 6,252,204, aim to prevent the cooking apparatus from being disassembled in various ways while the temperature-control device is inserted. These mechanisms, however, do not prevent unsafe connection of a temperature-control device with a cooking apparatus having folding legs. Therefore, there is a need for safety features that prevent a cooking appliance with folding legs from being connected to a power source when the legs are folded. There is also a need for safety features that prevent foldable legs collapsing when used with a temperature-control device.

SUMMARY OF THE INVENTION

The problems outlined above are solved in substantial part by the present invention. A cooking apparatus with foldable legs is provided with a barrier element that prevents connection of the cooking apparatus to a power source when the legs are folded but allows connection to a power source when the legs are extended and upright.

The cooking apparatus has a member with a heating plate, a heating element operably connected to the heating plate, and folding support members hingedly connected to the member. An inlet port, defining an opening and having a connector for a detachable temperature-control unit, is disposed on one side of the member. A barrier element extends from the folding support member proximate the inlet port. The barrier element is disposed so that it obstructs the inlet port when the support member is folded under the cooking apparatus. When the support member is extended, the barrier element allows access to the inlet port and, when a temperature-control unit is inserted, the barrier element prevent the support member from collapsing.

BRIEF DESCRIPTION OF THE DRAWINGS

The invention may be more completely understood by reference to the drawings summarized below:

FIG. 7 is a side elevational view of an embodiment of the invention depicting the side opposite the inlet port;

FIG. 8 is a rear elevational view of an embodiment of the invention;

FIG. 9 is a front elevational view of an embodiment of the invention;

FIG. 10 is a fragmentary perspective view with phantom lines depicting the inlet port of an embodiment of the invention when the neighboring support member is extended;

FIG. 11 is a fragmentary perspective view with phantom lines depicting the inlet port as in FIG. 10 but with the neighboring support member in folded position;

DETAILED DESCRIPTION OF THE DRAWINGS

Figure 1:
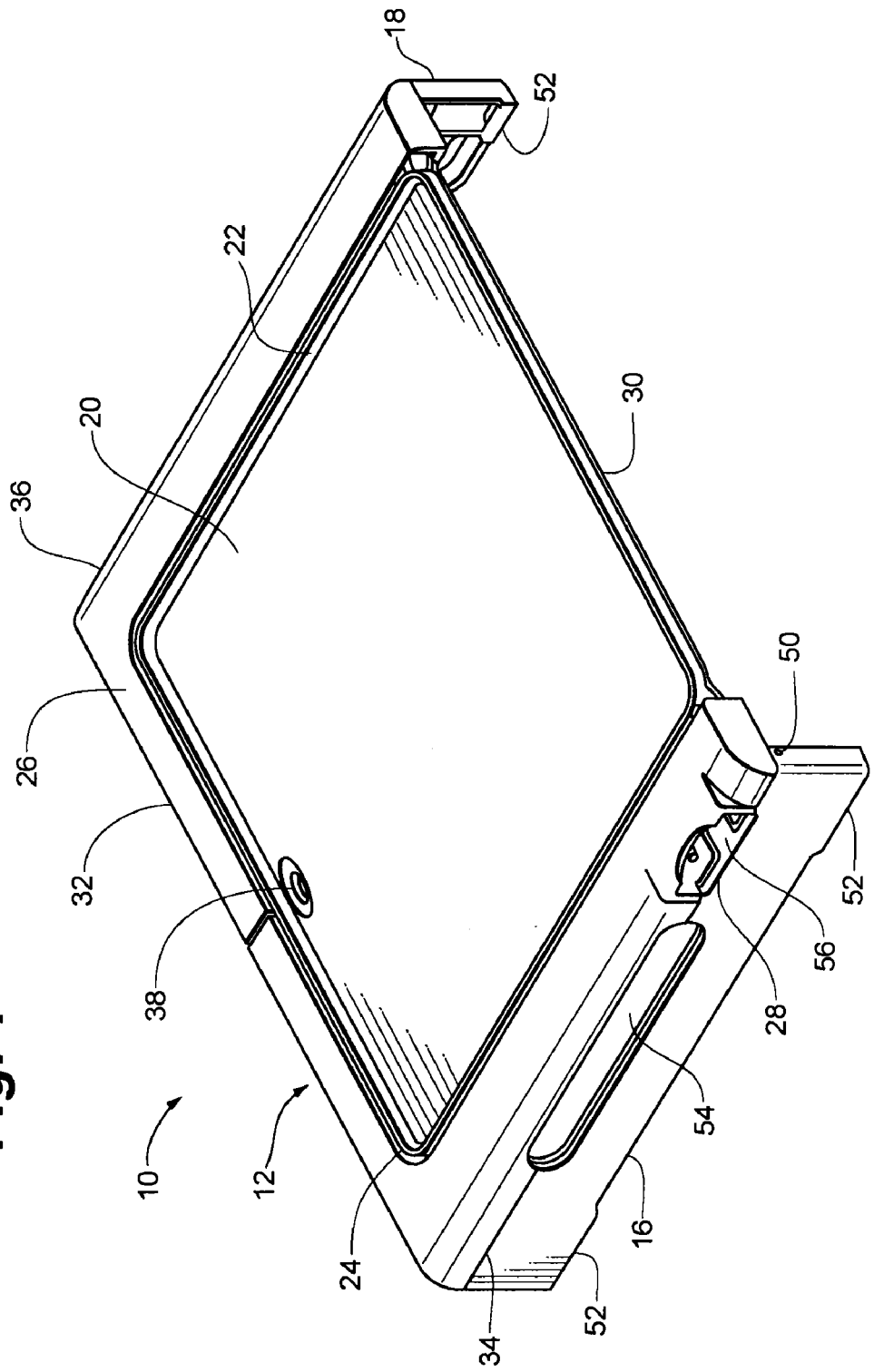
FIG. 1 is a perspective view of an embodiment of the invention.

Cooking apparatus 10 includes a member 12, a first support member 14, and a second support member 16. When support members 16, 18 are in their extended position, member 12 is generally horizontal and support members 16, 18 are generally vertical as shown in FIG. 1.

Member 12 includes a U-shaped frame 26 surrounding a generally rectangular heating plate 20. Channel 22 surrounds heating plate 20 on all four sides. Peripheral wall 24 separates channel 22 and heating plate 20 from frame 26. An insert port 28 opens from frame 26 above support member 16. Heating plate 20 has a front 30, back 32, and sides 34, 36. Peripheral wall 24 encloses back 32 and sides 34, 36 of heating plate 20.

Heating plate 20 is manufactured from a generally rigid material, such as steel or aluminum. The material chosen for heating plate 20 is also preferably a material capable of uniform heat transfer. Heating plate 20 may include a nonstick coating (not shown) for preventing food from sticking and for increasing the flow of fats and oils toward channel 22 and drain opening 38. The nonstick coating may include any of a number of commercially available products that can be applied to heating plate 20. One example of a nonstick coating that may be used comprises polytetrafluoroethylene.

Figure 2:
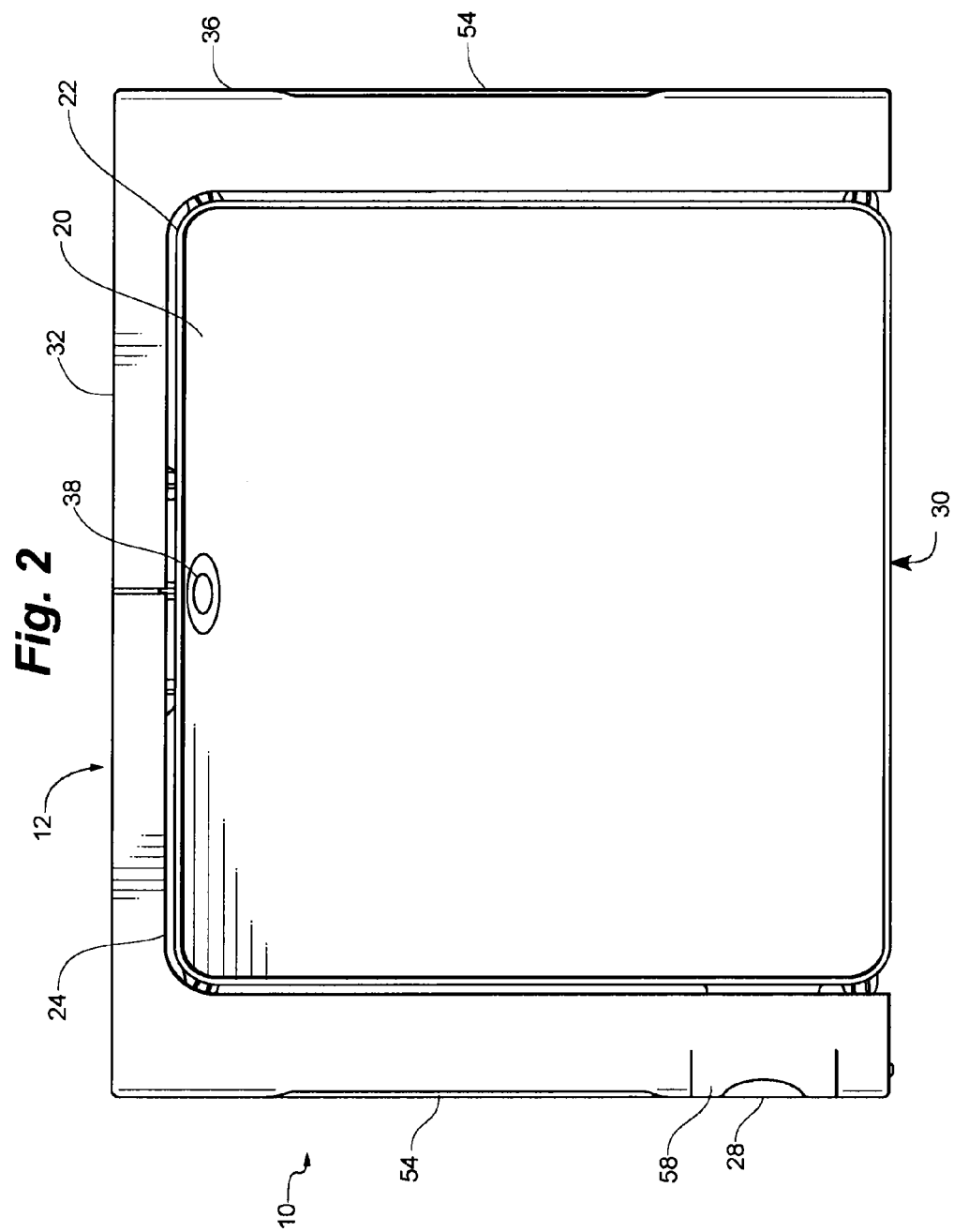
FIG. 2 is a top plan view of an embodiment of the invention.

A channel 22 follows perimeter 24 of heating plate 20. Proximate channel 22 at the back of heating plate 20 is a drain opening 38 that passes through heating plate 20 and member 12. The relationship between the structures of member 12 is best shown in the top view of FIG. 2. Channel 22 is preferably in fluid communication with drain opening 38, such that fats and oils entering channel 22 flow toward and through drain opening 38. Channel 22 may extend laterally away from drain opening 38 toward any one of the sides 30, 32, 34 or 36 of heating plate 20. Channel 22 may also have a depth that varies along its length. For example, the depth may increase as channel 22 approaches drain opening 38. The difference in the depth of channel 22 permits an increased flow of fats and oils toward and into drain opening 38.

Figure 3:
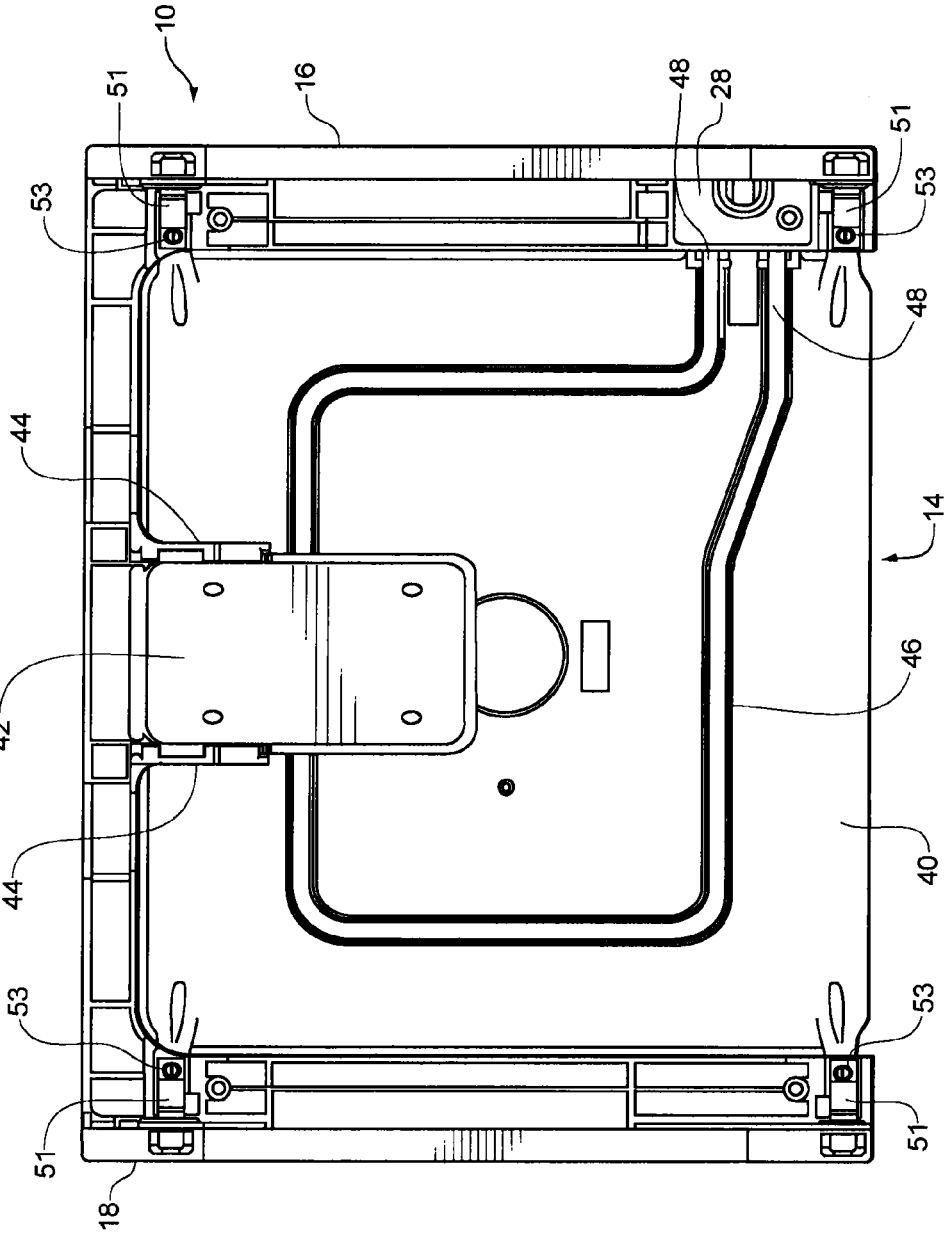
FIG. 3 is a bottom plan view of an embodiment of the invention.

The underside 14 of apparatus 10 is shown in FIG. 3. A collection pan 42 is positioned proximate the drain opening 38 in heating plate 20. Drain opening 38 passes through member 12 in fluid communication with collection pan 42. Collection pan 42 is slidably disposed on a pair of spaced rails 44 mounted to the under side 13 of member 12. Collection pan 42 is positioned generally underneath and in fluid communication with drain opening 38 and is of a material able to withstand the high temperatures of the fats and oils collected, such as heat-resistant plastic, aluminum, or metal alloy.

As shown in FIG. 3, heating element 46 runs in a generally rectangular shape around the bottom side 40 of heating plate 20. Heating element 46 includes a pair of ends 48 positioned generally near each other such that heating element 46 generally forms a loop. Each of the ends 48 are disposed in insert port 28.

Figure 4:
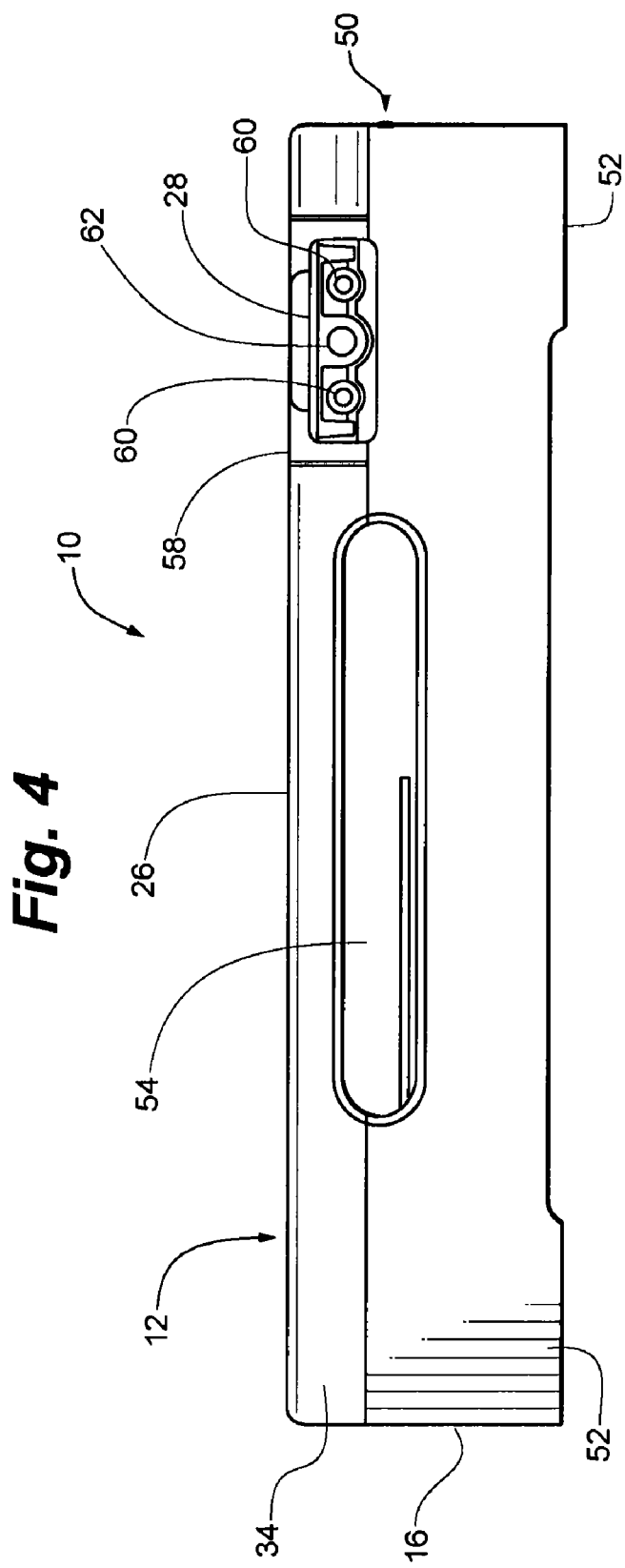
FIG. 4 is a side perspective view of an embodiment of the invention depicting the inlet port for a temperature-control device.

Insert port 28 opens laterally from side 34 of frame 26 above first support member 16 as shown in FIG. 4. The side view of cooking apparatus 10 in FIG. 4 shows inlet port 28 when first support member 16 is extended via hinge mechanism 50 and rests on feet 52, partially forming handle opening 54. FIG. 1 shows inlet port 28 in a perspective view that reveals a barrier element 56 extending into inlet port 28 horizontally. A comparison of FIG. 1 and FIG. 4 reveals that inlet port 28 is not obstructed in this configuration because barrier portion 56 extends generally horizontally and at the bottom of inlet port 28.

Barrier element 56 is formed integrally from the same material as that used to manufacture first support member 16. The thickness of barrier element 56 is approximately ¼", the same as the thickness of first support member 15. Such a barrier element can be formed by stamping or shaping support member 16 with barrier element 56 in the same plane as support member 16 and then bending barrier element 56 until it projects perpendicularly from support member 16. Other methods could also be used to fabricate barrier element 56. For example, a detachable barrier, formed from the same or different material as the support member 16 could also be used. Further, the angle of projection of barrier element 56 from first support member 16 can be adjusted so that it is not at an exact 90-degree angle, so long as the projection of barrier element 56 does not obstruct inlet port 28 when first support member 16 is in its extended and upright position.

Returning to FIG. 4, it can be seen that insert port 28 is positioned inside housing 58 in frame 26. Within inlet port 28 are disposed two male contact points 60 operably connected to ends 48 of heating element 46. Also disposed within insert port 28 between male contact points 60 is a temperature sensor inlet 62.

Figure 5:
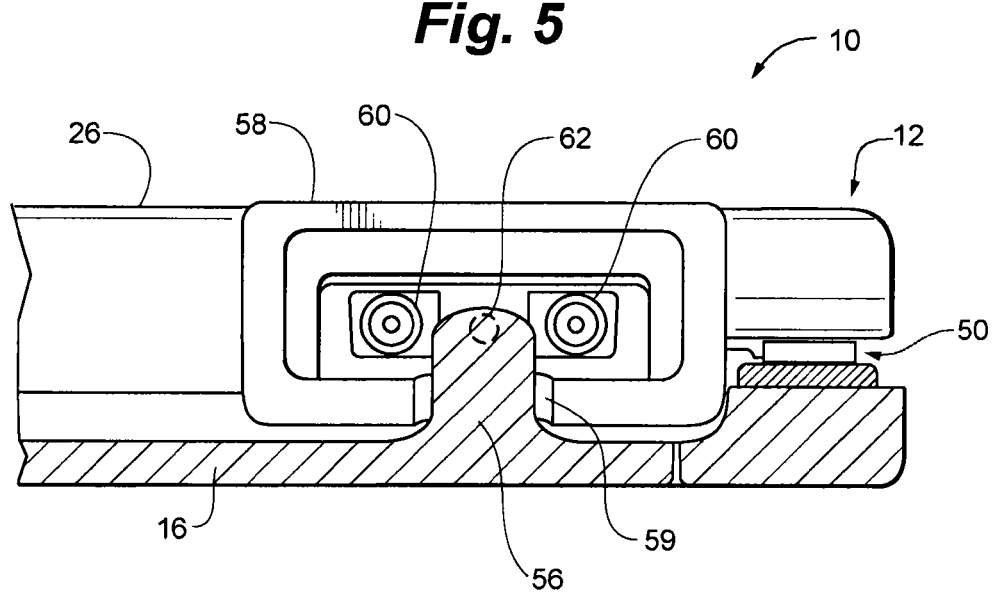
FIG. 5 is a detail of a side elevational view of an embodiment of the invention depicting the inlet port for a temperature-control device.

In FIG. 5, the disposition of inlet port 28 is shown when support member 16 is folded under member 12 via hinge mechanism 50. Barrier element 56 now extends from first support member 16 so that it blocks temperature sensor inlet 62. Inlet port 28 defines a recess 59 sized to allow barrier element 56 to pass through inlet port 28 when rotated hingedly from the extended position shown in FIG. 4 to the folded position shown in FIG. 5.

Figure 6:
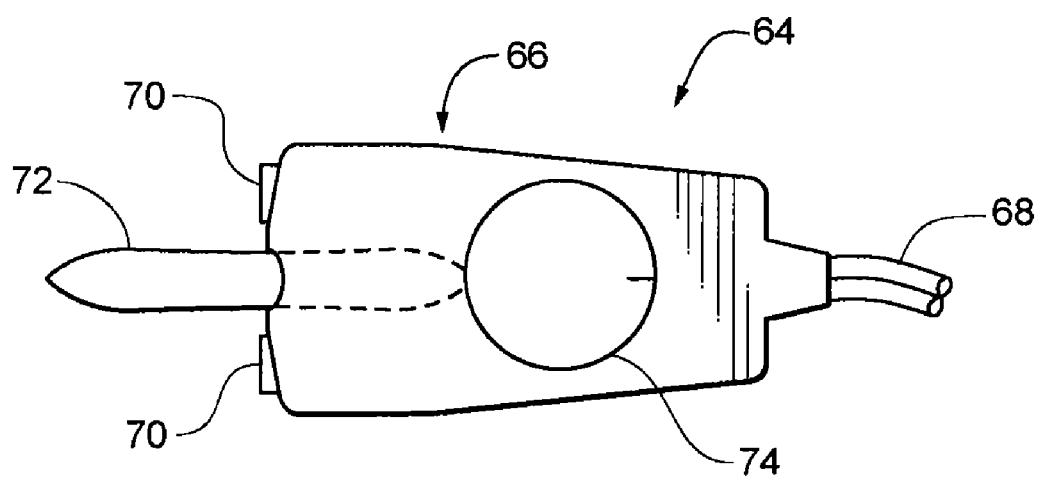
FIG. 6 depicts a temperature-control device for use with an embodiment of the invention.

The temperature of heating plate 20 may be adjusted by temperature-control device 64 inserted into inlet port 28, such as disclosed in U.S. Pat. No. 3,218,434 and incorporated herein by reference. Such a temperature-control device is shown in FIG. 6 and includes a housing 66, a cord 68, two female connectors 70, and a temperature sensor 72.

Support member 18 forms a handle opening 54 between the frame of member 12 and support member 18 as shown in FIG. 7. Handle opening 54 is sized so that it may be used to move cooking apparatus 10 when employed together with handle opening 54 formed by support member 16 shown in FIG. 4. As shown in FIG. 4 and FIG. 7, support members 16, 18 are connected to frame 26 of member 12 by hinge mechanisms 50 that allow support members 16, 18 to fold underneath member 12. The hinge mechanism used may include sufficient friction to retain support members 16, 18 in a folded position under their own weight. Springs or similar devices may therefore be incorporated in hinge mechanisms 50. When support members 16, 18 are extended, feet 52 provide support. When not in use, cooking apparatus 10 may be stored with support members 16, 18 folded so that the entire unit takes up less space.

A back view of cooking apparatus 10 is shown in FIG. 8. In this figure, the support members 16, 18 are extended and generally perpendicular to the orientation of inlet port 28. A front view of cooking apparatus 10 is shown in FIG. 9. This view shows the proximity of inlet port 28 to heating plate 20.

The interaction of inlet port 28, barrier element 56, and hinge mechanism 50 will now be described in greater detail.

Inlet port 28 is disposed on frame 26 of member 12. Inlet port 28 includes a housing 58 with a curved recess 57 for receiving a temperature-control unit. Within housing 58 are disposed two male contact points 60, each which extend from the back of housing 58 toward the opening of inlet port 28. Each male contact point 60 has an upper portion 61 that connects each male contact point with housing 58. Also within housing 58 is a sensor inlet 62 for the temperature sensor of a temperature-control device, such as, for example, the device depicted in FIG. 6. The lower portion of housing 58 includes curved recess 59, which is sized to receive barrier element 56 when barrier element 56 is rotated from a vertical position to a horizontal position.

Barrier element 56 extends perpendicularly from support member 16 and has the shape of a tongue with a curved end portion 63 and a straight lateral portion 65. When support member 16 is in an upright and vertical position, as depicted in FIG. 10, barrier element 56 extends horizontally and does not obstruct inlet port 28. When support member 16 is folded and stored horizontally under member 12, as depicted in FIG. 11, barrier element 56 extends vertically and obstructs sensor inlet 62.

Figure 12:
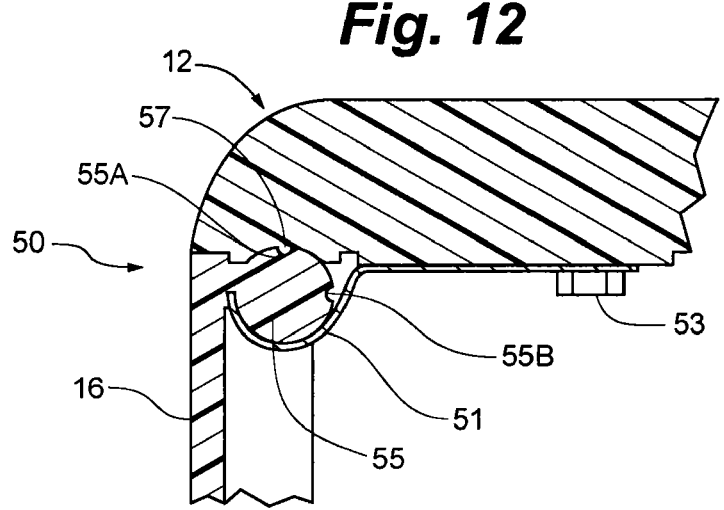
FIG. 12 is a fragmentary sectional view of the hinged connection between the member and support member of an embodiment of the invention when the support member is extended and upright.
Figure 13:
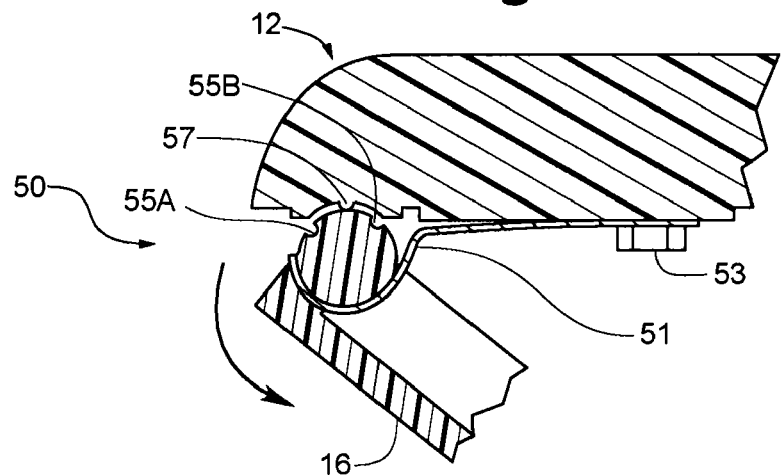
FIG. 13 is a fragmentary sectional view of the hinged connection of FIG. 12 when the support member is moving toward a folded position.
Figure 14:
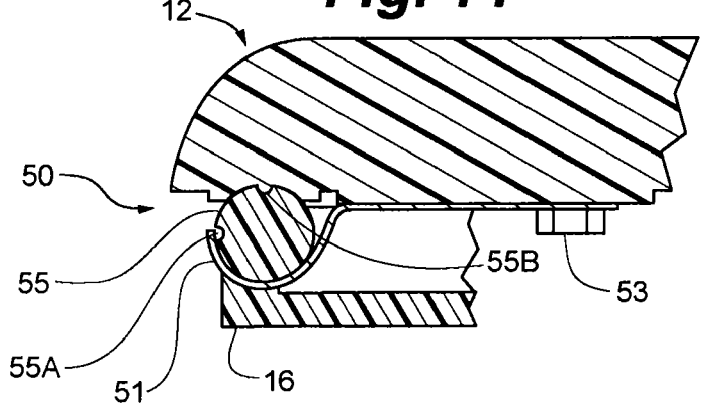
FIG. 14 is a fragmentary sectional view of the hinged connection of FIGS. 12 and 13 when the support member is in a folded position.

Hinge mechanism 50 forms an interface between member 12 and support member 16. As depicted in FIGS. 12-14, hinge mechanism 50 includes a cylinder portion 55 (extending from support member 16) and a spring 51 attached to member 12. Cylinder portion 55 has two recesses 55A, 55B each sized to mate with a bump portion 57 extending from member 12. Spring 51 is attached to member 12 by way of a fastener 53. Spring 51 is curved so that it fits around cylinder portion 55 and allows support member 16 to move hingedly in relation to member 12.

FIG. 12 depicts hinge mechanism 50 when support member 16 is upright and vertical. In this position, cylinder recess 55A is engaged with bump portion 57 while support member 16 is retained in an upright and vertical position by the spring force exerted by spring 51. FIG. 13 depicts hinge mechanism 50 when support member 16 is moving from an upright and vertical position to a folded and horizontal position. In this position, neither of cylinder recess 55A, 55B is engaged with bump portion 57 and support member 16 is pivoting against spring 51. FIG. 14 depicts hinge mechanism 50 when cylinder recess 55B has been engaged with bump portion 57 and support member 16 is in a folded and horizontal position.

In use, the support members 16, 18 are extended and the device is placed on a surface. Temperature-control device 64 is placed into insert port 28 so that male contact points 60 are mated with female connectors 70 and temperature sensor 70 is inserted in temperature sensor inlet 62. Heating element 46 is thus connected to a power source (not shown) via cord 68, such as a household electrical outlet, and starts to warm heating plate 20 for cooking. Other means for connecting the heating element to a power source could also be used, such as a plug attached to an electrical cord.

Barrier element 56 inhibits temperature-control device 64 from being connected to heating element 46 when first support member 16 is folded. When first support member 16 is folded under member 12, barrier element 56 is positioned in insert port 24 in a generally vertical position as shown in FIG. 5. Barrier element 56 is sized to block only temperature sensor inlet 62 while avoiding male contact points 60. With this design, barrier element 56 moves freely through recess 59 of inlet 28 when first support member 16 is folded. Other configurations of barrier element 56 may also be used, such as a shape that blocks access to at least one male contact point 60 by temperature-control device 64.

The interaction of barrier element 56 with temperature-control device 64, when inserted into insert port 28, also inhibits first support member 16 from collapsing. While temperature-control device 64 is mounted to inlet port 28 and support members 16, 18 are extended in a generally vertical arrangement, barrier element 56 inhibits first support member 16 from collapsing because it extends horizontally under temperature-control device 64. In this position, barrier element 56 cannot move upward because its path is blocked by temperature-control device 64. Since barrier element 56 cannot move upward, support member 16 cannot easily be folded under member 12 when heating element 46 is connected to a power source via insert port 28.

The scope of the invention is not limited to the embodiments illustrated and described. Rather, the scope of the invention is set forth in the appended claims and their equivalents.

The invention claimed is:

1. A cooking apparatus adapted to receive a detachable electrical control, the apparatus comprising:
   a cooking member including a heating plate;
   a heating element operably connected to the heating plate;
   an inlet port operably connected to the heating element;
   a support member shiftably attached to said member, said support member being shiftable between an extended first position and a stowed second position, said support member further including an inlet-port barrier element, said inlet-port barrier element accompanying the support member as the support member is shifted between the extended first position and the stowed second position, wherein the inlet port barrier element obstructs attachment of said detachable electrical control to the inlet port of said cooking apparatus when said support member is in said stowed second position.

2. The apparatus of claim 1 wherein the inlet port includes an opening for a temperature-sensor port and a power port, said barrier element sized to obstruct at least one of said temperature-sensor port or said power port.

3. The apparatus of claim 1 wherein the inlet port includes a recess sized to receive the barrier element when the support member is in said extended first position.

4. The apparatus of claim 1 further comprising a second support member shiftably attached to the cooking member.

5. The apparatus of claim 1 wherein the barrier element inhibits the support member from shifting to the stowed second position when the electrical control is attached to the inlet port.

6. The apparatus of claim 1 wherein the support member is rotatably shiftably attached to the cooking member by a hinge mechanism.

7. A cooking apparatus comprising
   a cooking member including a heating plate;
   a heating element operably connected to the heating plate;
   an inlet port operably connected to the heating element;
   a folding support member proximate the inlet port and shiftably attached to said cooking member and having an extended position and a stowed position;
   a barrier element extending generally perpendicularly from the support member and proximate the inlet port;
   a detachable electrical control electrically connected to the inlet port, wherein movement of the folding support member from the extended position to the stowed position is prevented by physical contact of the barrier element with the detachable electrical control.

8. The apparatus of claim 7 wherein the cooking member comprises a frame and the heating plate is generally planar and horizontal.

9. The apparatus of claim 7 wherein the cooking member further comprises an underside with a groove formed therein and wherein the heating element is disposed in the groove.

10. The apparatus of claim 7 further comprising a second support member shiftably attached to the cooking member.

11. The apparatus of claim 7 wherein the folding support member is shiftably attached to the cooking member by a hinge mechanism.

12. The apparatus of claim 7 wherein the detachable electrical control comprises an electrical cord.

13. The apparatus of claim 7 wherein the detachable electrical control comprises a temperature-control device.

14. A method for preventing the unsafe attachment and detachment of an electrical control and a cooking apparatus, the method comprising the steps of:
   providing a cooking apparatus adapted to receive a detachable electrical control, the apparatus comprising a cooking member including a heating plate; a heating element operably connected to the heating plate; an inlet port operably connected to the heating element; a support member shiftably attached to the cooking member and having a folded position and an extended position, said support member including a barrier element extending generally perpendicularly from the support member and disposed proximate the inlet port;

hingedly unfolding the support member into an extended position such that the barrier element resides in a recess defined within the inlet port; and inserting a detachable electrical control into the inlet port.

15. The method of claim 14 wherein the detachable electrical control comprises an electrical cord.

16. The method of claim 14 wherein the detachable electrical control comprises a temperature-control device.

* * * * *

UNITED STATES PATENT AND TRADEMARK OFFICE
CERTIFICATE OF CORRECTION

| | | |
|---|---|---|
| PATENT NO. | : 7,635,827 B2 | Page 1 of 1 |
| APPLICATION NO. | : 11/365965 | |
| DATED | : December 22, 2009 | |
| INVENTOR(S) | : Sie et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Twelfth Day of October, 2010

David J. Kappos
*Director of the United States Patent and Trademark Office*